(12) United States Patent
Green et al.

(10) Patent No.: US 10,749,309 B2
(45) Date of Patent: Aug. 18, 2020

(54) COMPACT OPTICAL FIBER AMPLIFIER

(71) Applicant: II-VI Incorporated, Saxonburg, PA (US)

(72) Inventors: Eric Timothy Green, Corning, NY (US); Daniel Christopher Myers, Elmira, NY (US); Todd Gregory Starner, Corning, NY (US); Martin Richard Williams, Big Flats, NY (US); Mark Filipowicz, Scotts Valley, CA (US)

(73) Assignee: II-VI Incorporated, Saxonburg, PA (US)

( * ) Notice: Subject to any disclaimer, the term of this patent is extended or adjusted under 35 U.S.C. 154(b) by 345 days.

(21) Appl. No.: 15/648,885

(22) Filed: Jul. 13, 2017

(65) Prior Publication Data
US 2017/0317463 A1    Nov. 2, 2017

Related U.S. Application Data

(63) Continuation-in-part of application No. 15/071,296, filed on Mar. 16, 2016, now Pat. No. 9,722,387.
(Continued)

(51) Int. Cl.
*H01S 3/067* (2006.01)
*H01S 3/30* (2006.01)
*H01S 3/16* (2006.01)
*G02B 6/44* (2006.01)
*G02B 6/36* (2006.01)

(52) U.S. Cl.
CPC ...... *H01S 3/06754* (2013.01); *H01S 3/06704* (2013.01); *H01S 3/1608* (2013.01); *H01S 3/302* (2013.01); *G02B 6/36* (2013.01); *G02B 6/4457* (2013.01); *G02B 6/4458* (2013.01)

(58) Field of Classification Search
CPC ... H01S 3/06754; H01S 3/06704; G02B 6/36; G02B 6/4457; G02B 6/4458
See application file for complete search history.

(56) References Cited

U.S. PATENT DOCUMENTS 4,984,685 A * 1/1991 Douglas ............... B65H 75/362
                                                    206/388
5,103,977 A * 4/1992 Douglas ............... B65H 75/364
                                                    206/388
(Continued)

FOREIGN PATENT DOCUMENTS

EP         1569308 A1    8/2005
WO     WO 01-76022 A2   10/2001

*Primary Examiner* — Eric L Bolda
(74) *Attorney, Agent, or Firm* — Wendy W. Koba (57) ABSTRACT

A fiber-based optical amplifier is assembled in a compact configuration by utilizing a flexible substrate to support the amplifying fiber as flat coils that are "spun" onto the substrate. The supporting structure for the amplifying fiber is configured to define the minimal acceptable bend radius for the fiber, as well as the maximum diameter that fits within the overall dimensions of the amplifier package. A pressure-sensitive adhesive coating is applied to the flexible substrate to hold the fiber in place. By using a flexible material with an acceptable insulative quality (such as a polyimide), further compactness in the final assembly is achieved by locating the electronics in a space underneath the fiber enclosure.

11 Claims, 13 Drawing Sheets

Related U.S. Application Data (60) Provisional application No. 62/135,641, filed on Mar. 19, 2015.

(56) References Cited

U.S. PATENT DOCUMENTS

| | | | |
|---|---|---|---|
| 5,469,526 A * | 11/1995 | Rawlings | G02B 6/4246 |
| | | | 385/135 |
| 5,726,796 A | 3/1998 | Regener et al. | |
| 5,917,648 A * | 6/1999 | Harker | H01S 3/06704 |
| | | | 359/333 |
| 6,144,792 A * | 11/2000 | Kim | H01S 3/06704 |
| | | | 385/135 |
| 6,334,020 B1 * | 12/2001 | Fujimori | G02B 6/4453 |
| | | | 385/134 |
| 6,412,701 B1 | 7/2002 | Kohama | |
| 6,567,600 B2 | 5/2003 | Yoshida | |
| 6,636,685 B2 | 10/2003 | Hicks | |
| 6,917,731 B2 | 7/2005 | Bennett | |
| 6,937,385 B2 | 8/2005 | Bennett | |
| 7,899,296 B2 | 3/2011 | Shukunami et al. | |
| 9,031,360 B2 | 5/2015 | Schneider | |
| 2003/0044141 A1 | 3/2003 | Melton | |
| 2005/0018950 A1 | 1/2005 | Arellano | |
| 2013/0077913 A1 | 3/2013 | Schneider | |
| 2016/0124171 A1 * | 5/2016 | Takahashi | G02B 6/4457 |
| | | | 385/134 |
| 2016/0274321 A1 | 9/2016 | McClean | |

* cited by examiner

COMPACT OPTICAL FIBER AMPLIFIER

CROSS REFERENCE TO RELATED APPLICATIONS

This application is a continuation-in-part of U.S. application Ser. No. 15/071,296, filed Mar. 16, 2016, which claims the benefit of U.S. Provisional Application Ser. No. 62/135,641, filed Mar. 19, 2015, both applications herein incorporated by reference.

TECHNICAL FIELD

The present invention relates to a fiber-based optical amplifier and, more particularly, to a compact configuration for the amplifying fiber portion of the optical amplifier.

BACKGROUND

Various types of fiber-based optical amplifiers, such as erbium-doped fiber amplifiers (EDFAs) and distributed Raman amplifiers (DRAs), are ubiquitous components of optical communication systems, eliminating the need to perform optical-electrical-optical signal transformations when regeneration of a fading optical signal is required.

In the case of EDFAs, an optical pump laser (typically operating at 980 nm) is coupled into a section of Er-doped optical fiber, and the incoming optical signal is propagated through the doped fiber with the pump light. The presence of the pump light with the erbium dopant generates amplification of the propagating optical signal by the transitions of the optically-excited erbium ions. Distributed Raman amplifiers (DRAs) operate by injecting short, high-power pulses along a section of transmission fiber that is supporting the propagation of an optical signal. The presence of these pulses (either co-propagating or counter-propagating with respect to the optical signal) excites the photons to higher energy levels, where the photons create stimulated emission as they return to their ground state.

The various components forming an optical amplifier module are typically made as fiber-coupled elements, and in some cases integrated (or hybridized) to form, for example, a combined isolator and WDM filter, or a combined isolator and GFF filter, or the like. Of course, lower cost and smaller-sized modules lower the overall system costs. Thus, the trend to smaller components, more hybridization and smaller modules has been taking place for some time. Indeed, the pressure for smaller form factors and lower costs continues to be exerted on the industry.

One path to assuage these demands is to continually reduce the size of the various components and, perhaps, increase their degree of integration. However, this is not easily accomplished in an environment where the cost of the amplifier module is also a concern. Indeed, the size of these components has decreased to the point where they cannot be readily assembled by low-cost labor (i.e., the size of some of these components can be on the order of 1 mm×1 mm×1 mm).

Furthermore, even with reduction in size of an optical amplifier module, such as from increasing the level of integration within the hybrid components, the different hybrids must be coupled to each other via fiber splicing and routing. As a consequence of the minimum bend radius of the optical fiber as well as the relatively large number of fiber splices and splice protectors mandating the same, the ability to further hybridize current configurations is quickly reaching its technical limits, size limits and economical possibilities of implementation. The "bend radius" is a determinative factor associated with defining an acceptable amount of signal loss. In particular, the loss exhibited by an optical signal increases with a smaller bend radius of the fiber in which the signal is propagating. At exceptionally small bend radius values, there may also be a physical failure of the fiber itself.

Thus, for a fiber-based optical amplifier to continue to meet the expectations of cost and size reduction, while maintaining performance requirements, a different approach to incorporating the amplifying fiber within the optical amplifier module appears to be required.

SUMMARY OF THE INVENTION

The needs remaining in the prior art are addressed by the present invention, which relates to a fiber-based optical amplifier and, more particularly, to a compact configuration for the amplifying fiber portion of the amplifier.

In accordance with one embodiment of the present invention, an exemplary optical amplifier is configured as comprising an optics module and a fiber module. The optics module is used to house the various optical devices utilized to process the amplified signal into an acceptable output form, and the fiber module is used to house the actual fiber within which the amplification is created. The inventive fiber module consists of a flexible substrate of insulative material (for example, a polyimide) with a pressure-sensitive adhesive top coating. The fiber itself is wound in a coil configuration on the insulative material and held in place by the adhesive coating. A support tray of a stiffer material is used to impart mechanical strength to the flexible material, and may be formed to include guides to ensure that the radius of the coil does not go below a defined minimum fiber bend radius.

A particular embodiment of the present invention may be configured as a rare earth-doped optical fiber amplifier, providing pump light of a specific wavelength to propagate along a coil of rare-earth (e.g., erbium) doped optical fiber at the same time as the input optical signal. Another embodiment of the present invention takes the form of a distributed Raman amplifier (DRA), where high-power laser pulses are injected into a signal path along which the input optical signal is propagating.

An exemplary embodiment of the present invention takes the form of an optical fiber amplifier comprising an optics module housing optical elements utilized in creating an output optical signal from an amplified version and a fiber module optically coupled to the optics module. The fiber module is used to house a section of amplifying fiber for creating gain in a propagating optical signal in the presence of pump light, where the fiber module specifically includes a flexible substrate for supporting the section of amplifying fiber in a configuration of flat coils and a support structure disposed underneath the flexible substrate, the support structure including an end termination for mechanically attaching the fiber module to the optics module.

A selected embodiment of the present invention may take the form of an optical fiber coil support structure comprising a fiber containment component including a central bobbin (forming a boundary defining a minimum diameter of a fiber coil) and an outer boundary element (forming a boundary defining a maximum diameter of a fiber coil). A bottom support sheet is attached to a bottom surface of the fiber containment component and an outer cover is attached to a top surface of the outer boundary element structure and at least a portion of the central bobbin, creating a space between the bottom support sheet and the outer cover for the support and storage of an optical fiber coil.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
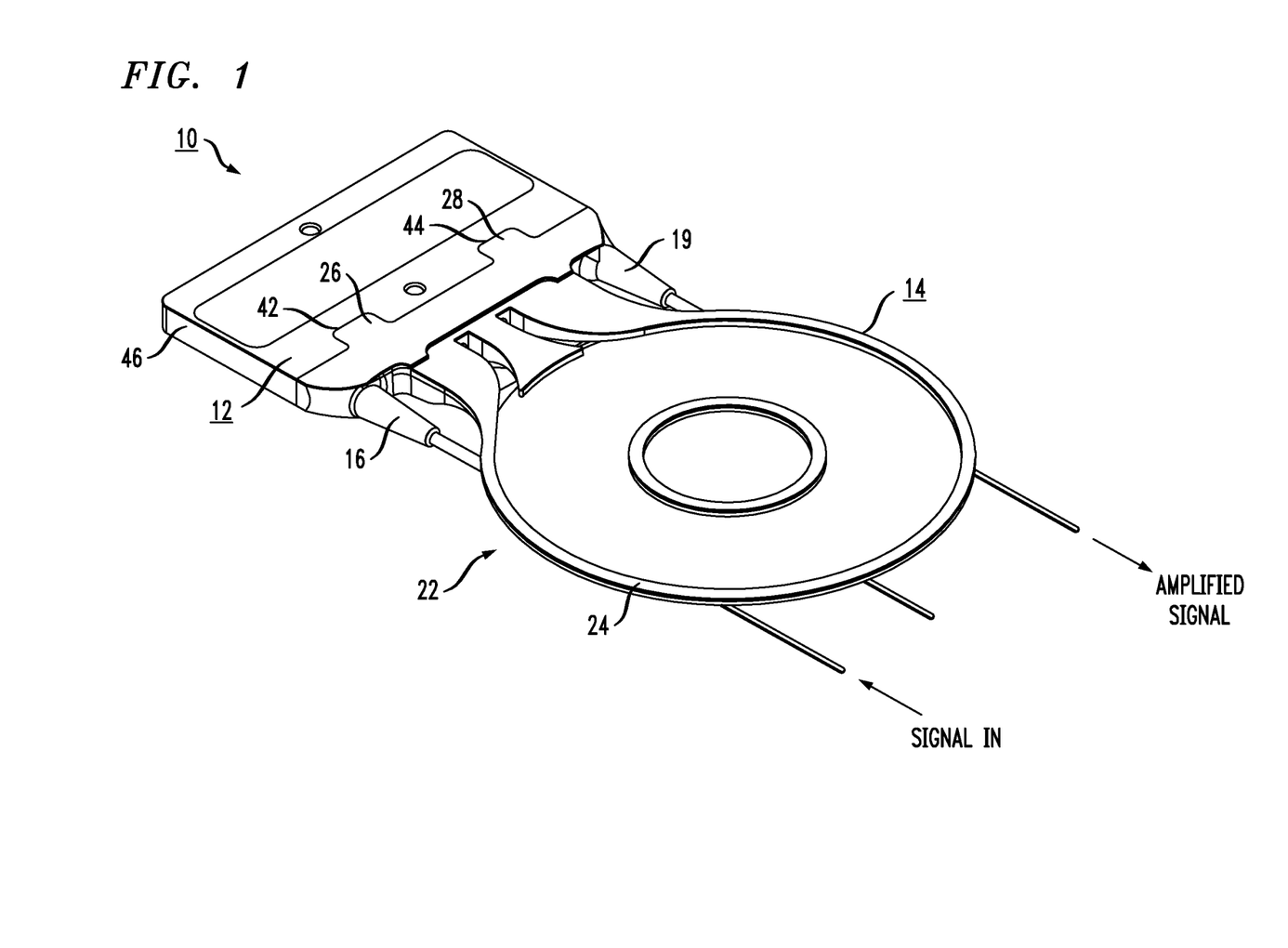
FIG. 1 is an isometric diagram of an exemplary optical fiber amplifier, formed in accordance with the present invention.

FIG. 1 is an isometric diagram of an exemplary compact optical amplifier 10, formed in accordance with the present invention. Optical amplifier 10 comprises both an optics module 12 and an amplifying fiber module 14. Optics module 12 is of conventional form perhaps, and includes various optical elements, hybrids, etc. utilized to create an amplified output signal that meets defined system requirements (in terms of, for example, noise floor, isolation, gain profile, insertion loss, etc.). Fiber module 14 houses a (relatively long) section of amplifying fiber that is used to perform the actual amplification function on the incoming optical signal. There exist many different configurations that may be used to provide the optical functions as required within optics module 12, where co-pending U.S. application Ser. No. 15/072,520 (filed Mar. 17, 2016) describes some preferred embodiments and is herein incorporated by reference.

Figure 3:
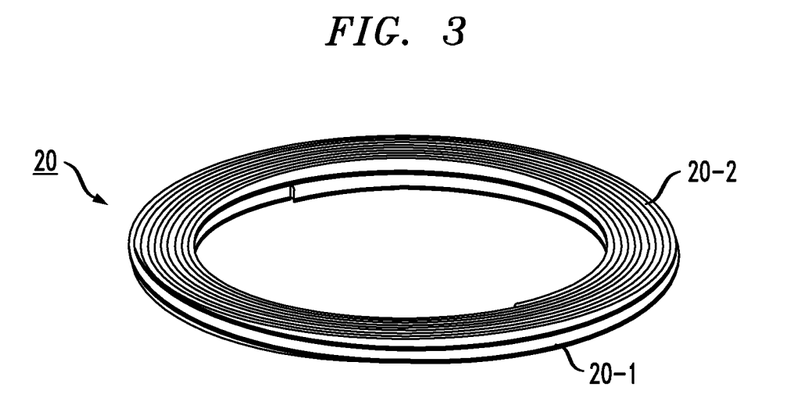
FIG. 3 depicts a section of amplifying fiber, presented as a flat coil for use within the fiber module of the amplifier.

For the sake of clarity, fiber module 14 is shown in FIG. 1 without having the amplifying fiber in place. It is to be understood that when designing a rare-earth doped fiber amplifier, a section of doped fiber (e.g., erbium-doped fiber) would be placed within fiber module 14. For the case of a distributed Raman amplifier, a section of conventional single-mode fiber is typically disposed within fiber module 14. An exemplary process of loading the amplifying fiber into module 14 will be described below in association with FIGS. 3-5.

Figure 2:
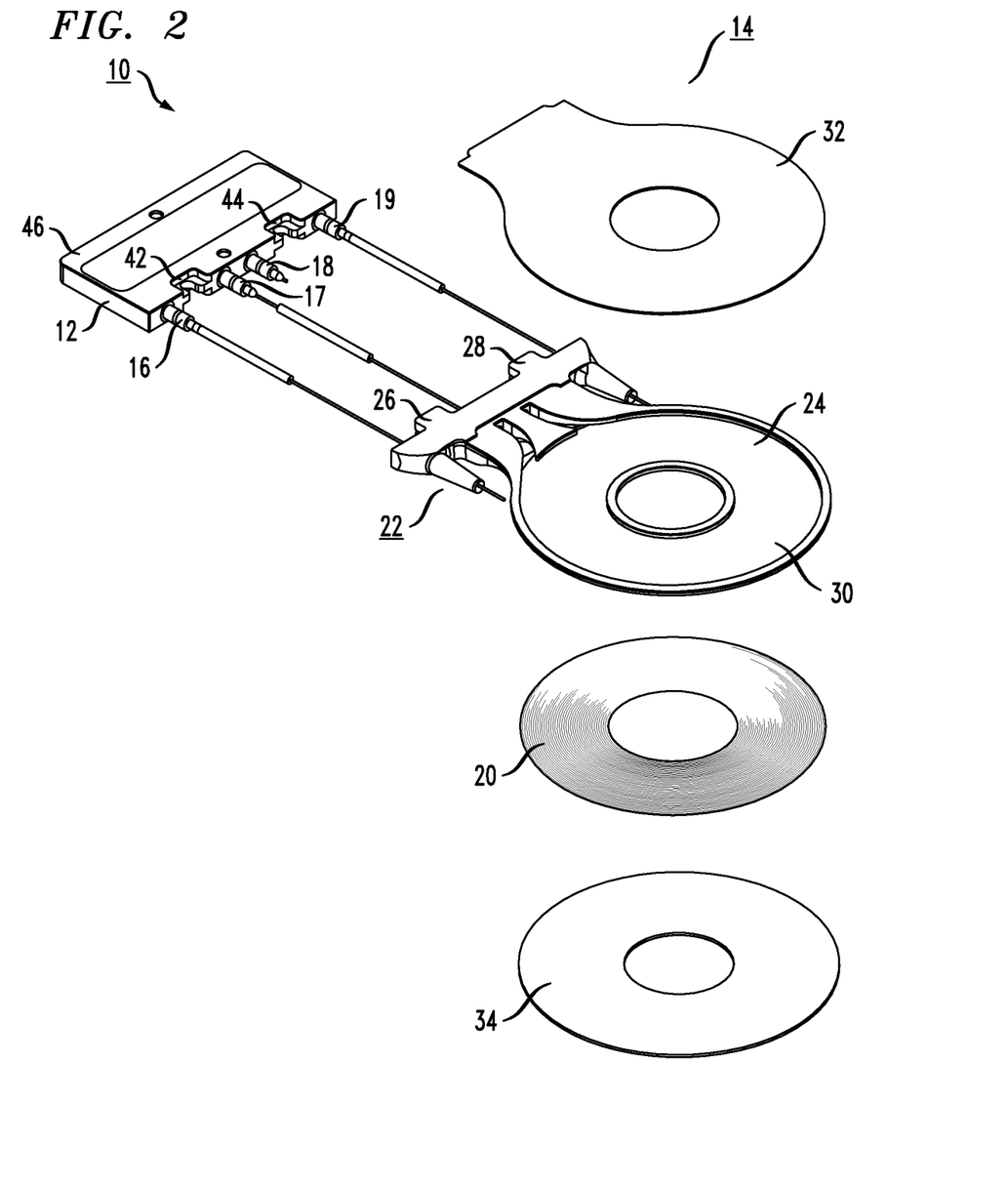
FIG. 2 is an exploded view of the optical fiber amplifier of FIG. 1.

FIG. 2 is another view of exemplary compact optical amplifier 10, in this case an exploded view with optics module 12 shown as separated from fiber module 14, and a set of exemplary components forming fiber module 14 also shown. Referring to both FIGS. 1 and 2, an incoming optical signal is introduced in optics module 12 via a fiber pigtail connection 16. The incoming optical signal and pump light (which may be supplied from a separate external source or co-packaged within optics module 12) are combined within optics module 12 and coupled into fiber module 14 via a pigtail fiber connection 17. The optical signal and pump light then propagate through the length of amplifying fiber 20 housed with fiber module 14, with an amplified version of the optical signal ultimately exiting fiber module 14. The amplified signal is then coupled back into optics module 12 at an optical fiber pigtail 18. Various post-amplification optical functions (gain flattening, power adjustments, etc., as dictated by specific system requirements) are performed on the signal, which then exits optics module 12 from optical fiber pigtail 19 as the amplified output signal from optical amplifier 10.

In the specific embodiment of FIG. 2, fiber module 14 is shown as comprising a stiff support member 22 configured to have a relatively circular distal portion 24 and an opposing pair of end terminations 26 and 28 that are used to attach fiber module 14 to optics module 12. A flexible substrate 30 of a suitable insulative material (e.g., a polyimide-based material) is disposed within support member 22, and a coating 31 of a pressure-sensitive adhesive is applied to flexible substrate 30. The adhesive coating is used to ensure the integrity of the attachment of amplifying fiber 20 to flexible substrate 30. Also shown in FIG. 2 is a top cover plate 32 and a bottom cover plate 34, used to encase amplifying fiber 20 within fiber module 14 (as shown in final form in FIG. 1).

Variations of this specific configuration are contemplated, including the use of fewer or more end terminations to mechanically attach fiber module 14 to optics module 12. Additionally, while it may be preferred to include an adhesive coating 31 on flexible material 30, there may be some types of flexible material that exhibit an adhesive nature without the need for the additional coating.

Figure 4:
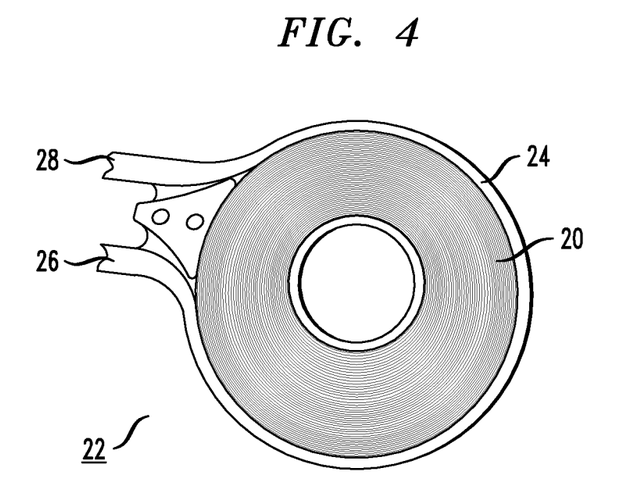
FIG. 4 illustrates the coil of amplifying fiber of FIG. 3 as disposed on an exemplary fiber module.

One aspect of the present invention is the particular configuration of the amplifying fiber as a flat coil (as compared with bundling the fiber as is common in the prior art). In the particular illustration of FIG. 3, amplifying fiber 20 is shown as being coiled in a manner that creates a "stack" of two flat coils shown as 20-1 and 20-1. FIG. 4 illustrates a coil of amplifying fiber 20 as in place within circular portion 24 of support structure 22. In the process of fabricating this portion of the compact optical amplifier, the amplifying fiber is literally spun onto flexible material 30, using a pressure sufficient to allow for adhesive coating 31 to hold the coiled fiber in place.

In the implementation of an EDFA, amplifying fiber 20 comprises a section of rare-earth doped fiber about one meter in length (at times, more than a meter may be required). DRAs may utilize conventional signal mode optical fibers of lengths of several meters in the formation of amplifying fiber 20. In attempting to incorporate these relatively long lengths of amplifying fiber within packages of relatively small dimensions, it is necessary to understand the impact of bend loss on the propagating signal. That is, if a fiber is bent into a curve (in this case, when forming a coil) with a very tight bend radius, a large fraction of the propagating signal will be scattered out of the core region; the loss increases as the fiber radius decreases. A very small fiber bend radius may also cause breakage of the fiber itself. On the other hand, if the bend radius is maintained at a large value (i.e., such that only a relatively "gentle" bend is imparted on the fiber), the size of a package required to accommodate a meter or two of amplifying fiber would be too large for many of the CFP requirements.

Figure 5:
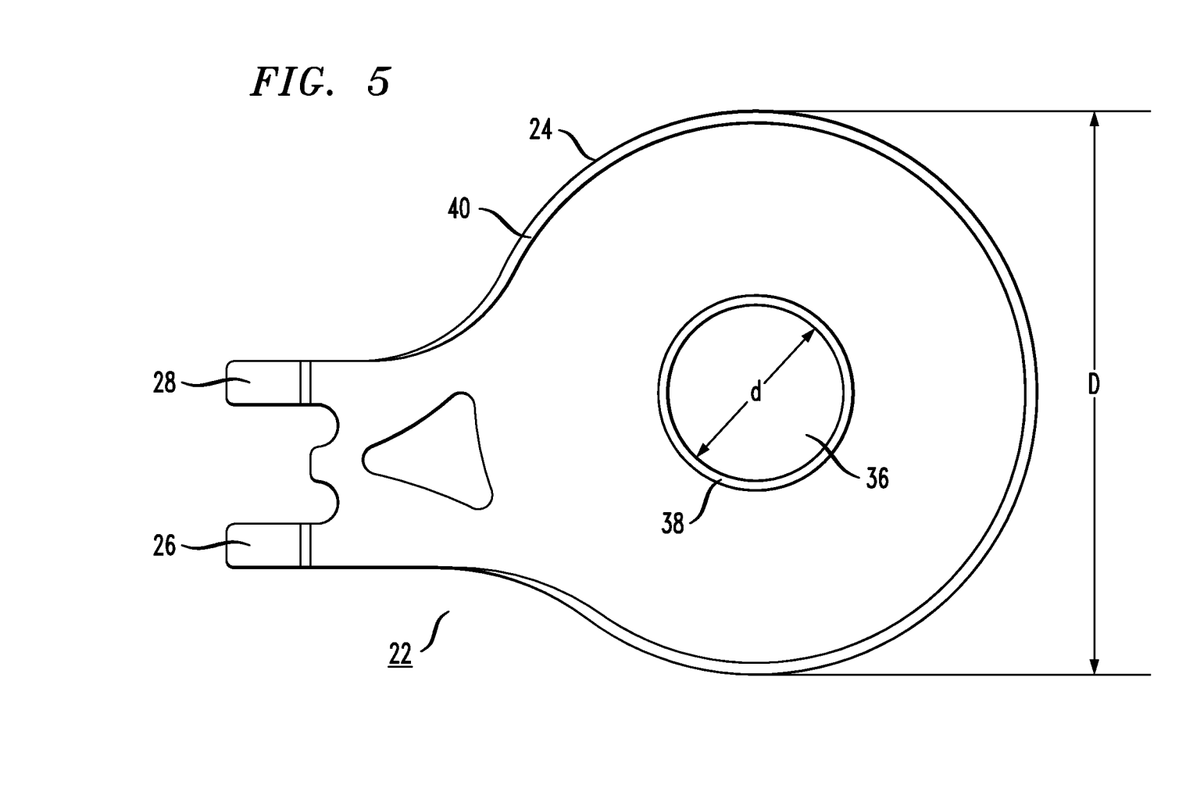
FIG. 5 is a diagram of the support structure portion of the fiber module, illustrating the parameters that control the bend radius experienced by the amplifying fiber as it is coiled.

FIG. 5 is a diagram of an exemplary support structure 22 formed in accordance with these aspects of the present invention to control the curvature introduced into the coil configuration of amplifying fiber 20. In particular, circular portion 24 of support structure 22 is shown as including a central opening 36, where the diameter d of opening 36 is chosen to prevent amplifying fiber 20 from being coiled with a very tight bend radius. The outer diameter D of circular portion 24 is chosen to ensure that the final dimensions of optical amplifier 10 are well within the limitations imposed by the particular package design. Opening 36 may include a rim 38 to prevent the amplifying fiber from entering this central area. Similarly, the outer periphery of support structure 22 may include a rim 40 to maintain the fiber confined within its designated boundary.

In one exemplary assembly process, amplifying fiber 20 is spun onto the surface flexible substrate 30 of support structure 22, using opening 36 (with rim 38) and outer rim 40 as guides for the process. That is, amplifying fiber 20 is spooled in a flat configuration, rather than bundled as in the prior art, with miniature splice protectors inserted in place for connection to fiber pigtails 17 and 18. As such, this portion of the optical amplifier may be assembled with automated methods, making a highly repeatable process with high yield and low cost, as well as a small footprint.

It is to be understood that there are a variety of different configurations that may be used to mechanically attach fiber module 14 to optics module 12 (the optical connection provided via fiber pigtails 17 and 18, as explained above). The exemplary configuration as shown in FIGS. 1 and 2 utilizes a straightforward snap-fit friction fitting between end terminations 26, 28 of fiber module 14 and associated attachment elements 42, 44 formed within the housing 46 of optics module 12 (best shown in FIG. 2).

Figure 6:
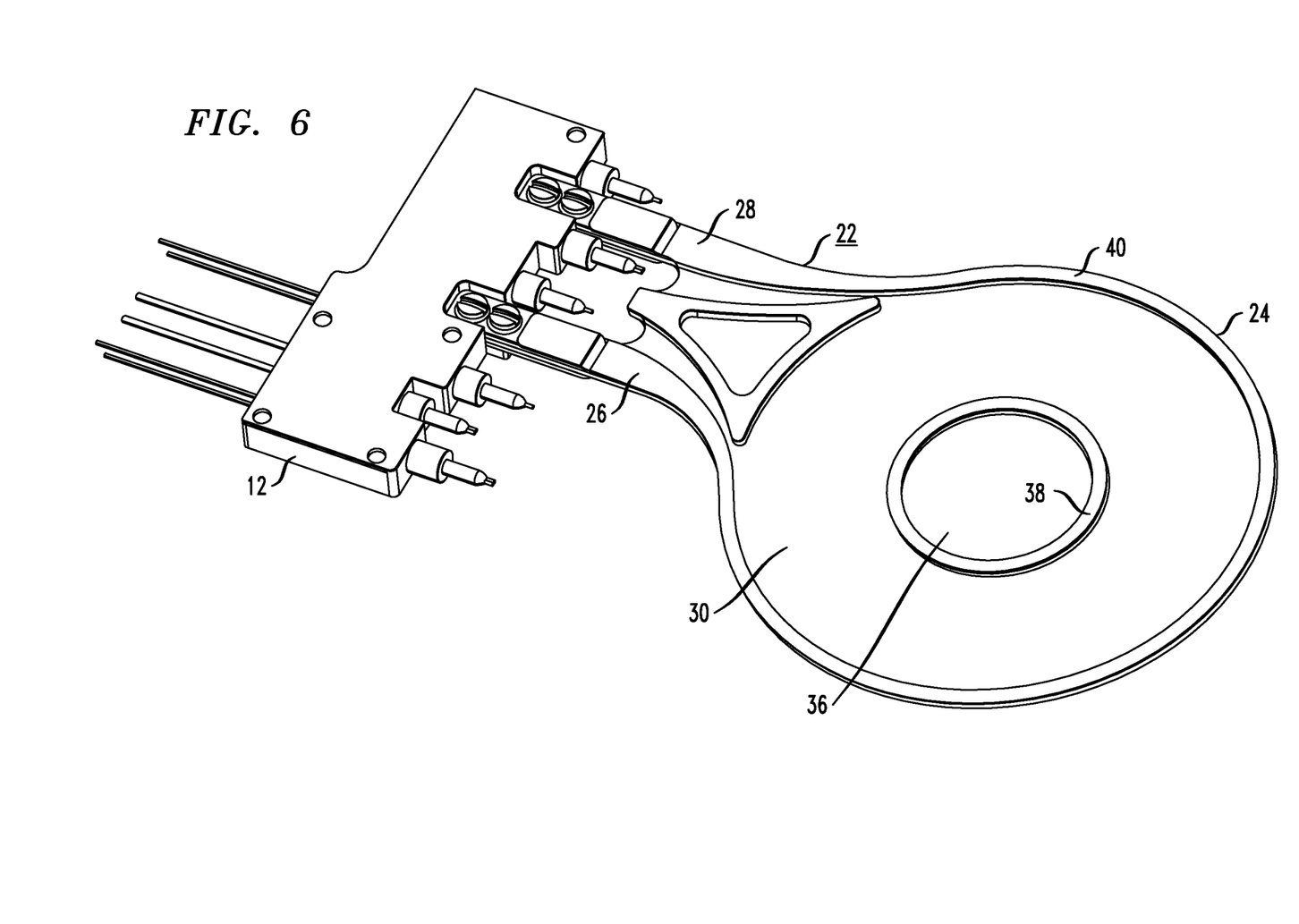
FIG. 6 illustrates an alternative configuration for attaching the fiber module to the optics module of the inventive optical amplifier.

FIG. 6 is an isometric view of an alternative attachment configuration, in this case using a set of screws 48 to attach end terminations 26, 28 of fiber module 14 to housing 46 of optics module 12. The specifics of rims 38 and 40 are also specifically shown in this view of the inventive compact optical amplifier module. from underneath optical amplifier 10, showing the attachment of fiber module 14 to optics module 12. In this view, both end terminations 26 and 28 are visible, with stiffening elements 42 and 42' disposed as shown. Attachment screws 50 and 52 are shown as attaching end termination 26 to optics module 12, with similar attachment screws 50' and 52' used to attach end termination 28.

Figure 7:
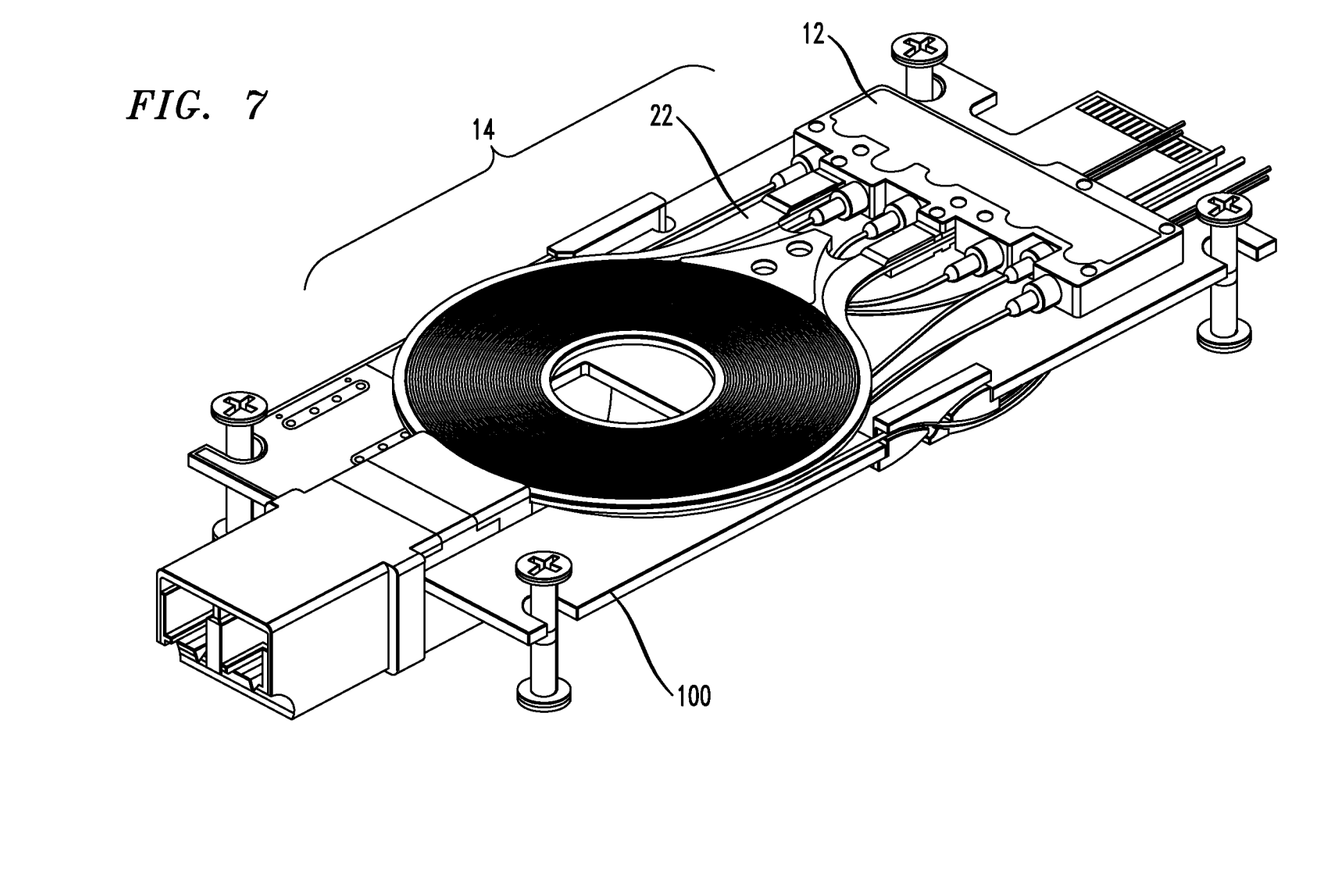
FIG. 7 shows a compact configuration where the electrical isolation provided by the material of the fiber module allows for an electronic circuit board to be positioned in close proximity to the optical amplifier.

As mentioned above, another advantage of the compact amplifier module configuration of the present invention is that support structure 22 of fiber module 14 is formed of an insulative material. As such, it is possible to locate associated electric circuits in close proximity to fiber module 14 without affecting its performance. FIG. 7 is an exemplary illustration of the inventive compact optical amplifier that illustrates this aspect. For the sake of clarity, the covering layer enclosing amplifying fiber 20 is not shown. In this case, an electronics circuit board 100 is illustrated as being disposed directly underneath compact optical amplifier 10, extending beneath both optics module 12 and fiber module 14.

It is to be understood that the inventive fiber module for use with a fiber-based optical amplifier may be used in the formation of a doped fiber amplifier (such as an EDFA) or a distributed Raman amplifier, with the only change in assembly being the type of fiber that is spooled onto the flexible substrate of the module. With that said, the particular dimensions of support structure 22 (particularly central opening 32) may differ as a function of a minimum bend radius associated with a particular amplifier's design criteria.

Figure 8:
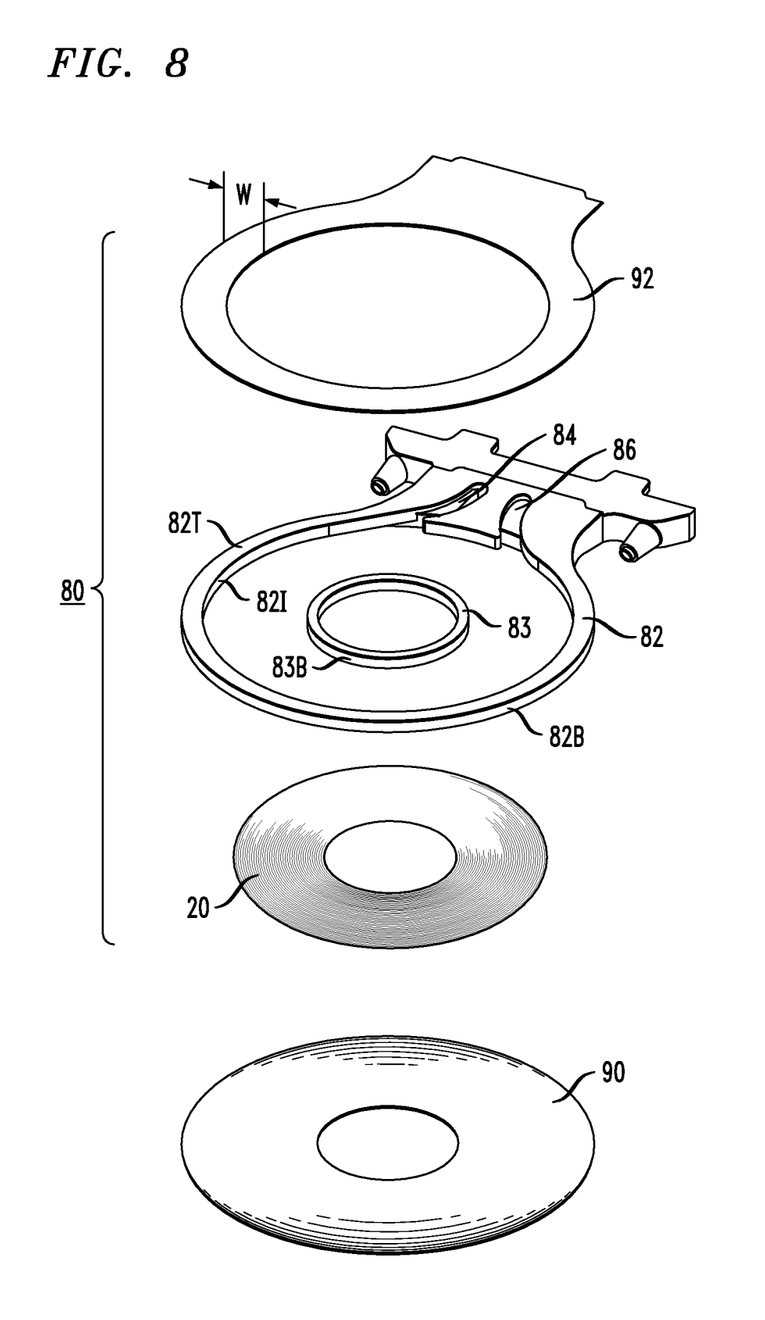
FIG. 8 is an exploded view of an alternative embodiment of a fiber module formed in accordance with the present invention.

FIG. 8 illustrates another embodiment of a low-profile structure for enclosing and supporting one or more coils of optical fiber, particularly suitable for use with an optical amplifier or any other fiber-based device. Fiber support structure 80 is shown in an exploded view in FIG. 8, and in an assembled form in FIG. 9. In this particular embodiment, fiber support structure 80 includes a containment component formed of an outer boundary element 82 and a bobbin 83, where bobbin 83 is disposed within an inner area of outer boundary element 82. The dimensions of bobbin 83 define the minimum bend radius permitted for a coil of fiber disposed within fiber support structure 80 and wound around bobbin 83. In some embodiments, outer boundary element 82 may be formed to include fiber lead-ins 84 and 86. Outer boundary element 82 and bobbin 83 may be formed of any suitable material, including relatively stiff plastic materials.

In accordance with this embodiment of the present invention, a first sheet of plastic material 90 (e.g., polyimide, polycarbonate, or the like) is attached around a bottom surface 82B of outer boundary element 82 and a bottom surface 83B of bobbin 83B. This first sheet of plastic material is defined hereinafter as "bottom sheet 90" of fiber support structure 80. Fiber coil 20 is disposed upon bottom sheet 90, with the diameter of fiber coil 20 being less than the inner diameter of outer boundary element 82. A second, top sheet of plastic material 92 (formed of the same or similar material as bottom sheet 90) is then disposed to cover a top surface 82T of outer boundary element 82. Sheets 90 and 92 may be welded to outer boundary element 82 (e.g., ultrasonic, thermal or chemical welding) or otherwise adhered to the ring.

Figure 9:
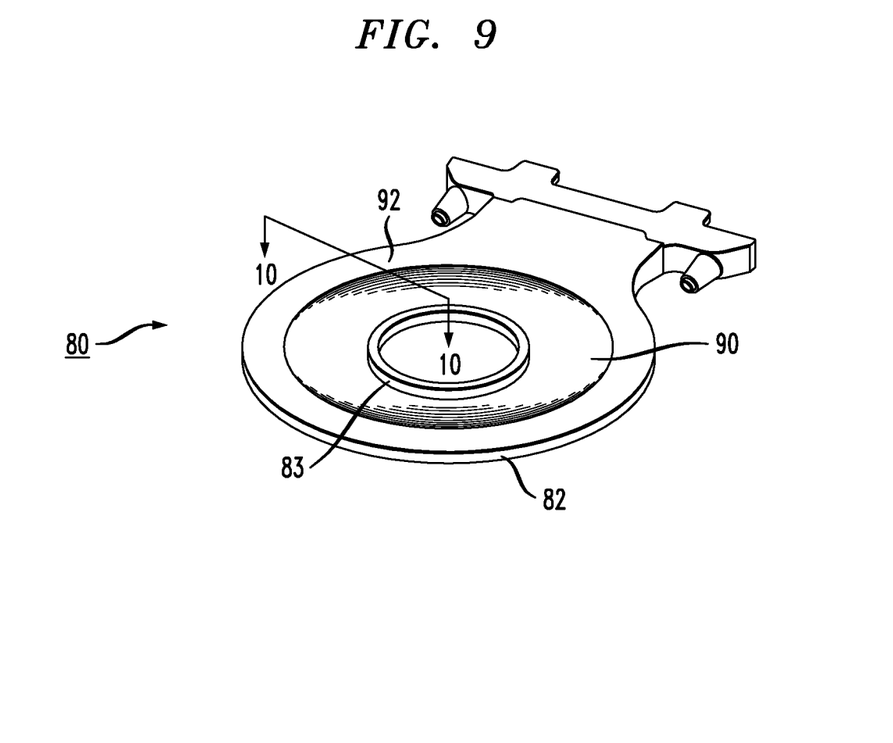
FIG. 9 is an isometric view of the fiber module of FIG. 8.
Figure 10:
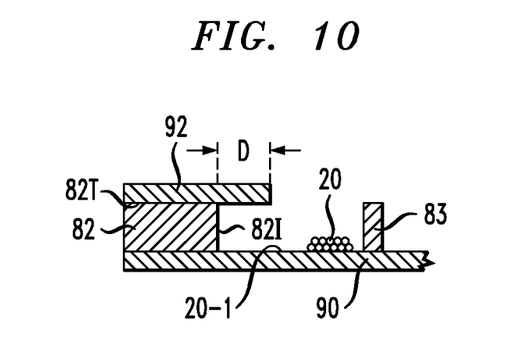
FIG. 10 is a cut-away side view of a portion of the fiber module of FIG. 9.

In one or more configurations of this embodiment of the present invention, top sheet 92 may comprise a predetermined width W that allows for top sheet 92 to slightly overhang an inner surface 82I of outer boundary element 82. FIG. 10 is a cut-away side view of a portion of the configuration of FIG. 9, illustrating an overhang D of top sheet 92 with respect to inner surface 82I of outer boundary element 82 and bottom sheet 90. Overhang D is designed to create a covered outer portion of fiber support structure 80 that extends for a width that is slightly longer than at least two fiber diameters, as shown in FIG. 10. This configuration allows for spliced portion of the fibers to be inserted underneath the overhang, as will be described below. Optionally, features such as slots or cuts can be included in the overhanging portion of top sheet 92 to allow fibers to escape the structure in a controlled fashion, as may be desirable during assembly operations.

Figure 11:
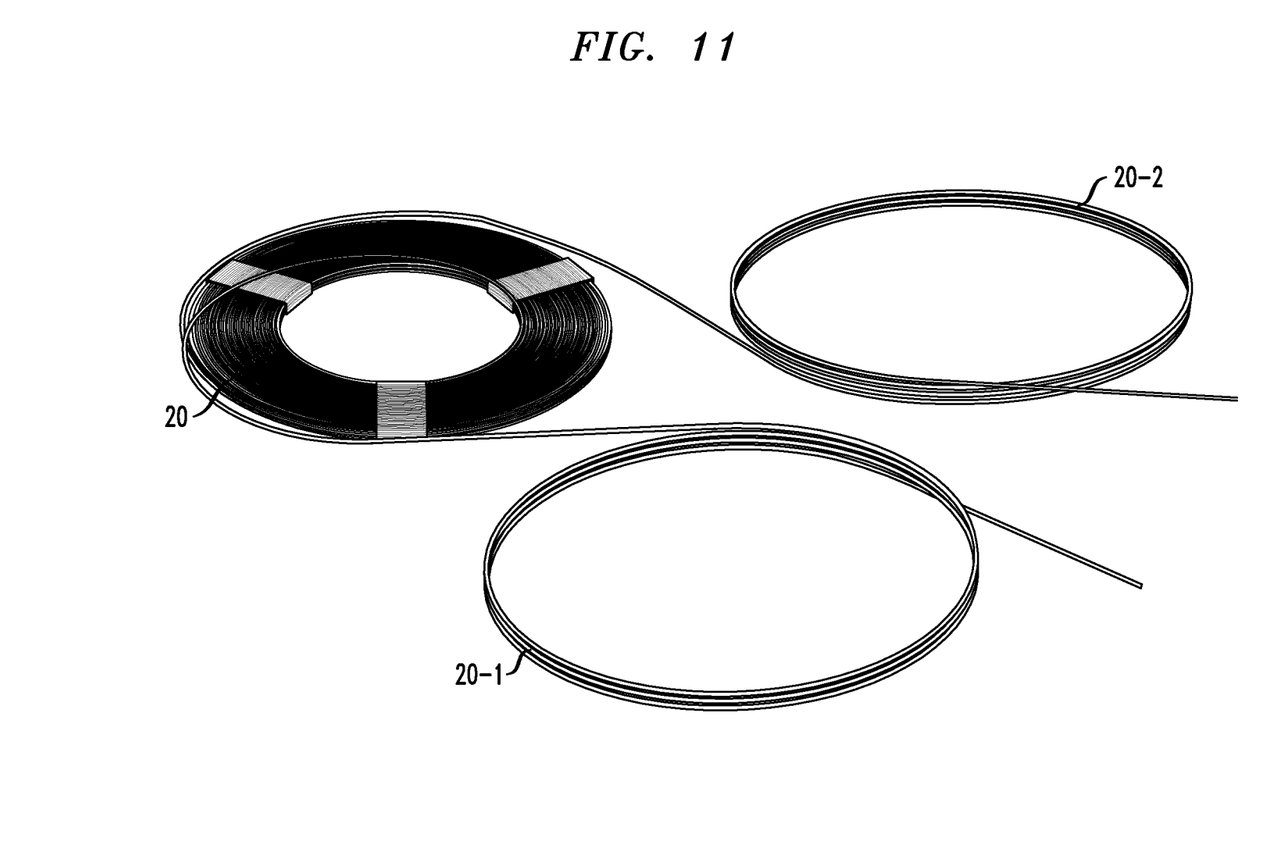
FIG. 11 illustrates an exemplary set of three fiber coils that may be housed within the fiber module of FIG. 8.
Figure 12:
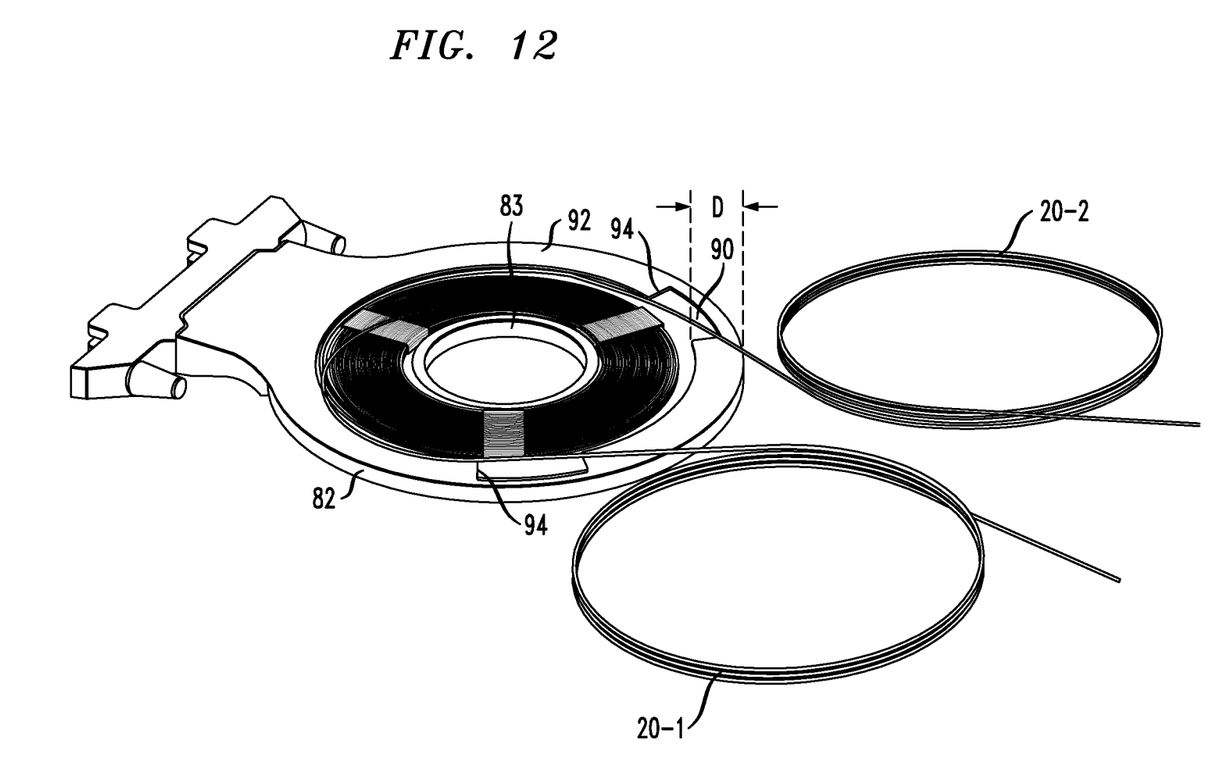
FIG. 12 shows a first fiber coil as positioned with the fiber module.

When used to support a coil of fiber, the diameter of the coil is such that it typically occupies only a portion of the available volume within fiber support structure 80. In this case, a non-occupied region of fiber support structure 80 (e.g., a region covered by an overhang of top sheet 92, as described above) may be reserved for storage of additional fiber, which is often necessary when performing splices during installation or repairs. FIG. 11 illustrates a set of fibers that may be housed within fiber support structure 80. Shown in this illustration is pre-made fiber coil 20, as discussed above, as well as a first fiber splice section 20-1 and a second fiber splice section 20-2, where each splice section is coupled to an opposing end termination of fiber coil 20. FIG. 12 shows fiber coil 20 as positioned on bottom sheet 90 of fiber support structure 80, prior to positioning fiber splices 20-1 and 20-2 within an outer portion of fiber structure 80 underneath the overhang created by top sheet 92. It is to be understood that a fiber coil is not necessarily planar, or may include a plurality of planar coils that are positioned in a stacked configuration around bobbin 83 of fiber support structure 80.

Figure 13:
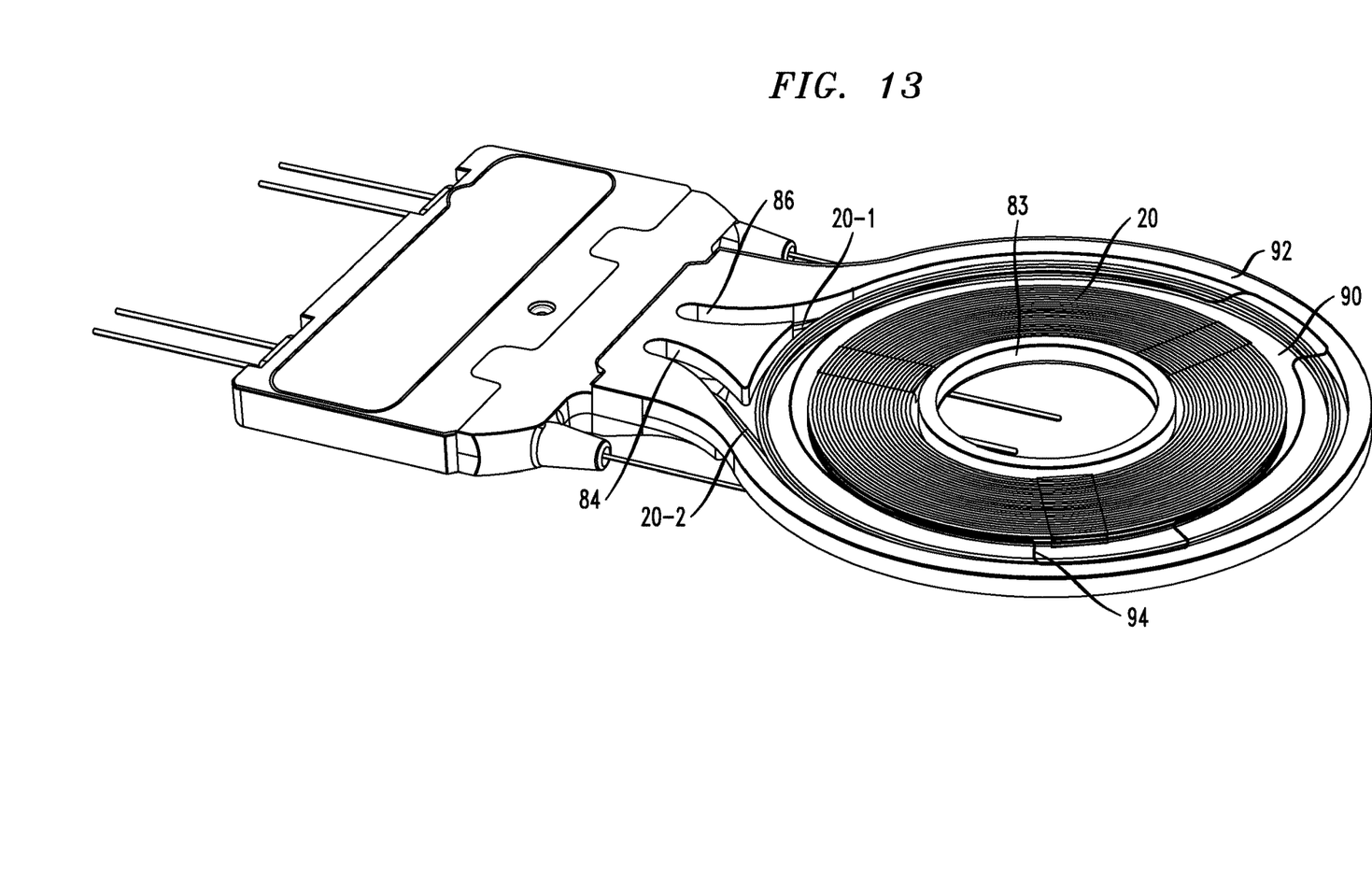
FIG. 13 shows a final assembly, with a pair of fiber splice coils disposed in an outer portion of the fiber module, separate from the primary fiber coil.

Indeed, the lengths of fiber splices 20-1 and 20-2 which extend from pre-made coil 20 are controlled to a precision that ensures that the splices will naturally fall at a predetermined location within fiber support structure 80 that is selected for minimal stress on the fiber, which in turn results in high reliability. The lengths are further specified such that, when the fiber is folded and looped to ever-smaller coils until they fit into the reserved outer portion of the structure. Therefore, the fiber achieves a minimum stress condition (i.e., there are no residual stresses in the fiber that would otherwise result from twists if the lengths were uncontrolled or poorly controlled). FIG. 13 illustrates fiber splices 20-1 and 20-2 as positioned within fiber support structure 80.

As shown in FIG. 13, the loops of spliced fiber 20-1 and 20-2 naturally expand to fill the maximum diameter of the reserved portion of the structure. Therefore, the splices reside near the maximum available diameter (i.e., close to inner surface 82I of outer boundary element 82) and are subjected to the minimal possible bending stress in their final deployed state, ensuring high reliability and low insertion loss.

Also evident in FIG. 13 is overhang D of top sheet 92 which allows splices 20-1 and 20-2 to be positioned underneath top sheet 92 and then positioned in place along on outer portion of bottom sheet 90 of fiber support structure, as described above. Slots 94 are also shown in this view, used to control the placement of splices 20-1 and 20-2 within fiber structure 80.

Figure 14:
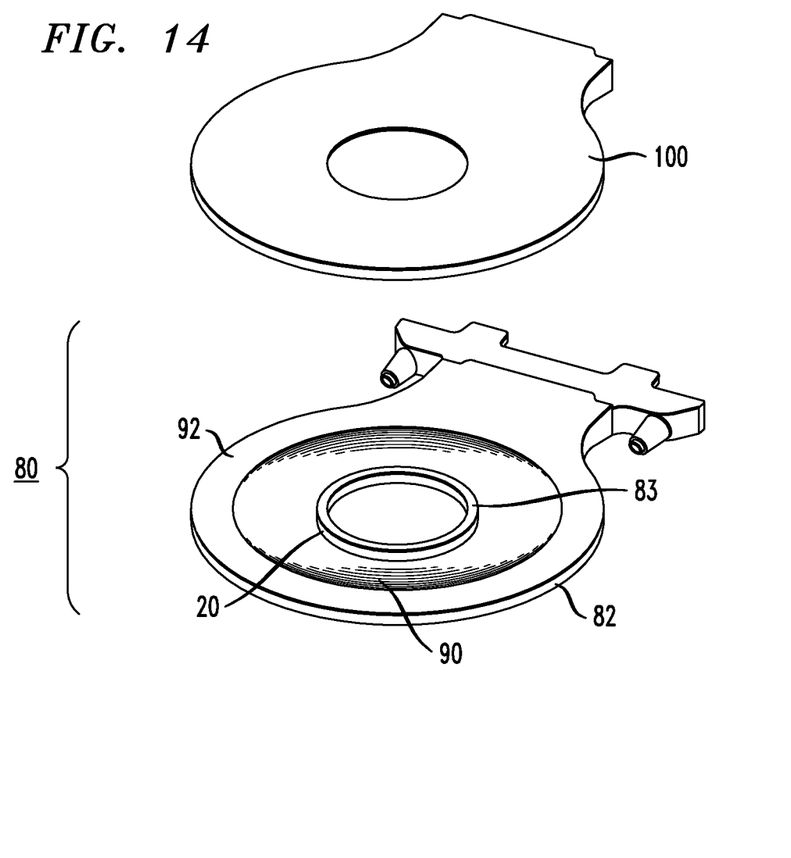
FIG. 14 is an exploded view showing an outer cover to be placed over the module of FIG. 13.
Figure 15:
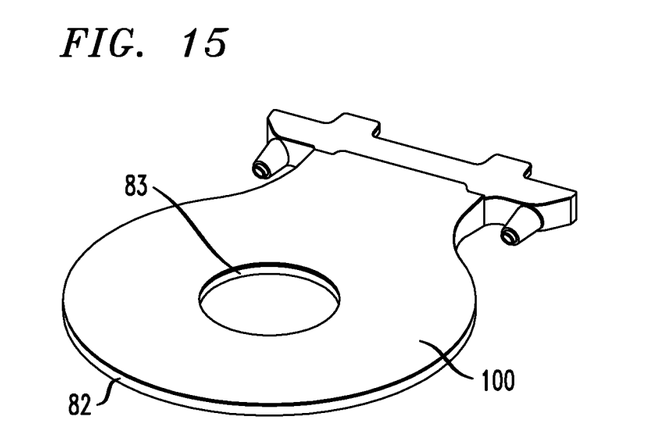
FIG. 15 illustrates the exemplary fiber module of FIG. 9 with the outer cover in place.

In its final form, fiber support structure 80 may further include an outer cover to encase and protect the stored fiber coil 20, as well as splices 20-1 and 20-2 (and/or any other fibers to be contained within support structure 80). FIG. 14 is an exploded view of an exemplary configuration, showing an outer cover 100 relative to fiber structure 80. It is to be noted that fiber coil 20, as well as splices 20-1 and 20-2 are not shown in this view. FIG. 15 is a final view, showing outer cover 100 in place over and attached to top sheet 92 of fiber structure 80.

Figure 16:
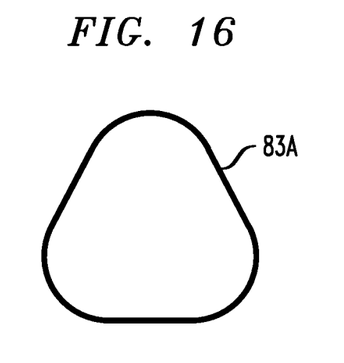
FIG. 16 illustrates an alternative geometry of a central bobbin that may be used within a fiber support structure in accordance with the present invention.

While the specific embodiment illustrated in FIGS. 8-15 illustrate the use of a circular outer boundary element 82 and bobbin 83, other geometries may be employed, as long as the induced bend (curving) of the optical fiber around the bobbin is not greater than the minimal allowable bend radius. For example, a somewhat rounded, triangular-shaped bobbin may be used, shown as bobbin 83A in FIG. 16.

Figure 17:
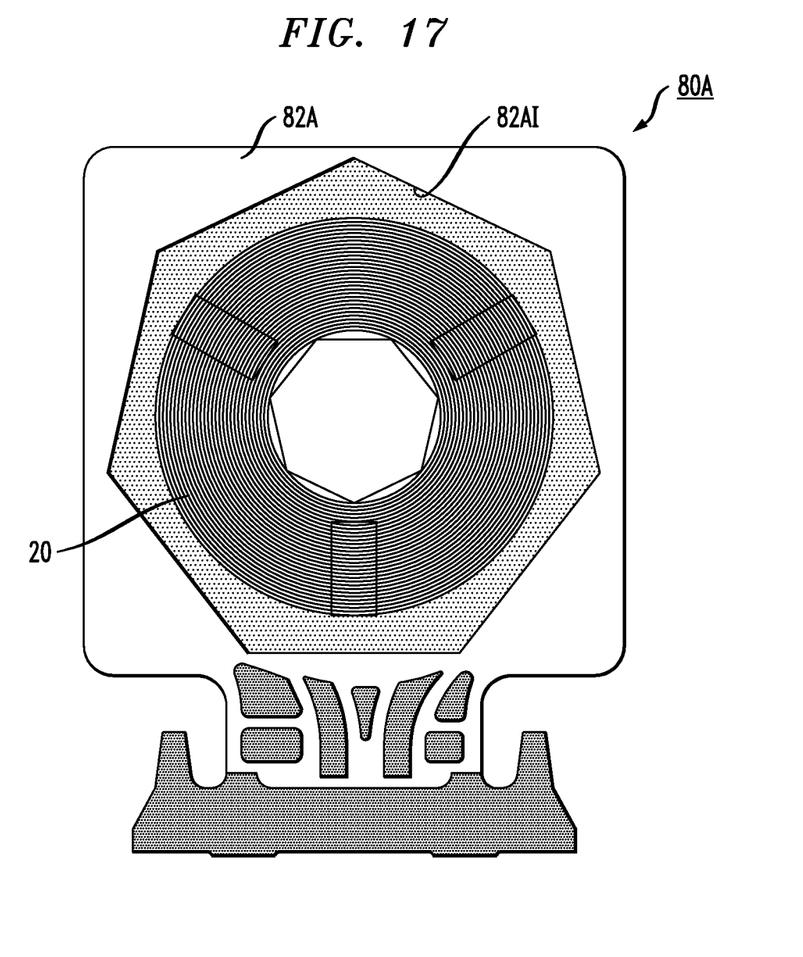
FIG. 17 illustrates an alternative geometry of an outer boundary element that may be used within a fiber support structure in accordance with the present invention.

FIG. 17 is a top view of an exemplary fiber support structure 80A, which in this case utilizes a non-circular outer boundary element 82A (which is still configured to comply with minimum bend radius constraints for a given fiber in accordance with the present invention). In this particular example, an inner periphery 82AI of outer boundary element 82A is heptagonal in form, providing sufficient space for fiber coil 20, while also having additional space for any fiber splices which may be added. It is to be noted that the outer shape of outer boundary element 82A may be any suitable form. In the particular configuration shown in FIG. 17, the outer boundary is rectangular in form. In other cases, it may be circular, or may follow the heptagonal design of inner periphery 82AI. Of course, the heptagonal geometry of outer boundary element 82A should be considered as exemplary only; various other geometries may be used as long as they adhere to the bend radius requirements for a specific application.

It will be appreciated by those skilled in the art that changes may be made to the embodiment described above without departing from the broad inventive concept thereof. It is understood, therefore, that this invention is not limited to the particular embodiment disclosed, but it is intended to cover modification s within the spirit and scope of the inventive concept as defined by the appended claims.

What is claimed is:

1. An optical fiber coil support structure comprising
    a fiber containment component including a central bobbin forming a boundary defining a minimum bend radius diameter of a fiber wound into a coil form around the central bobbin, and an outer boundary element forming a boundary defining a maximum diameter of a fiber coil;
    a bottom support sheet attached to a bottom surface of the fiber containment component; and
    a top support sheet disposed attached to a top surface of the outer boundary element and sized to slightly overhang a width of the outer boundary element, leaving exposed both a major extent of an interior portion of the bottom support sheet, and also the central bobbin, wherein additional lengths of fiber splices may be disposed underneath the overhanging width of the top support sheet.

2. The optical fiber coil support structure of claim 1 wherein the bottom support sheet is welded to the fiber containment component.

3. The optical fiber coil support structure of claim 1 wherein the bottom and top support sheets are welded to the outer boundary element.

4. The optical fiber coil support structure of claim 1 wherein the top support sheet is formed to include one or more slots to provide access to the fiber coil within the fiber coil support structure.

5. The optical fiber coil support structure of claim 1 wherein the bottom support sheet is formed of a plastic material.

6. The optical fiber coil support structure of claim 5 wherein the plastic material is selected from the group consisting of polyimide, polycarbonate, polyvinylchloride.

7. The optical fiber coil support structure of claim 1 wherein the top support sheet is formed of a transparent material.

8. The optical fiber coil support structure of claim 7 wherein the top support sheet is formed of a transparent plastic material.

9. The optical fiber coil support structure of claim 1 wherein the outer boundary element includes channels for supporting lengths of optical fiber entering and exiting the fiber coil support structure.

10. The optical fiber coil support structure of claim 1 wherein the central bobbin of the fiber containment component exhibits a circular outer periphery.

11. The optical fiber coil support structure of claim 1 wherein the outer boundary element of the fiber containment component exhibits a circular inner periphery.

\* \* \* \* \*